United States Patent [19]

Redmon et al.

[11] 4,433,827
[45] Feb. 28, 1984

[54] HIGH PRESSURE SHUT-OFF VALVE

[75] Inventors: Billy L. Redmon; Buford G. Forester, both of Pasadena, Tex.

[73] Assignee: Custom Oilfield Products, Inc., Houston, Tex.

[21] Appl. No.: 327,331

[22] Filed: Dec. 4, 1981

[51] Int. Cl.³ .............................................. F16K 25/00
[52] U.S. Cl. .................................... 251/191; 251/197; 251/266; 251/270
[58] Field of Search ............... 251/191, 195, 197, 200, 251/266, 270

[56] References Cited

U.S. PATENT DOCUMENTS

| | | | |
|---|---|---|---|
| 1,958,988 | 5/1934 | Eisele | 251/270 |
| 2,331,557 | 10/1943 | Lorehn | 251/191 |
| 2,385,463 | 9/1945 | Penick | 251/197 X |
| 2,552,991 | 5/1951 | McWhorter | 251/191 UX |
| 2,930,577 | 3/1960 | Bredtschneider | 251/200 |
| 3,314,442 | 4/1967 | Volpin | 251/197 X |
| 4,314,688 | 2/1982 | Leman | 251/191 |

Primary Examiner—Harold W. Weakley
Attorney, Agent, or Firm—Neal J. Mosely

[57] ABSTRACT

A high pressure shut-off valve consists of a hollow valve body having an open end, a closed end and a cylindrical cavity with a cover therefor. Aligned tubular inlet and outlet portions on opposite sides of the valve body form a continuous straight bore intersecting the cavity at a right angle thereto. A plug valve assembly positioned in the valve body cavity has a supporting mandrel a slidable therein between an extended position abutting the closed end and a retracted position some distance therefrom. The mandrel has an end portion with a laterally extending valve passage and an intermediate portion closing the valve body bore when in the extended position, the valve passage being aligned with the bore when in the retracted position. A sealing sleeve member of elastomeric material surrounds the mandrel intermediate portion and engages the entire circumferential wall of the cavity around the bore to seal against leakage when the valve is closed. A non-rising threaded stem, operated by a hand wheel, moves the plug valve assembly between the extended and retracted positions and has a lost motion connector engageable with the sleeve member in the extended position to compress the sleeve member longitudinally along said mandrel. Metal discs are positioned in holes in the sleeve member aligned with the bore when the valve is closed to prevent extrusion of the sleeve into the bore. A pressure release passage in the valve body bleeds line pressure to the cavity above the sleeve member to pressurize the same when in the valve closed position.

22 Claims, 8 Drawing Figures

HIGH PRESSURE SHUT-OFF VALVE

BACKGROUND OF THE INVENTION

1. Field of the Invention

This invention relates to new and useful improvements in high pressure shut-off valves and more particularly to a shut off-valve of in-line construction.

2. Brief Description of the Prior Art

Shut-off valves for controlling high pressure fluids and gases are well known in the art. Most shut-off valves, however, have been of an angle type construction or, if of an in-line construction, have not been capable of sealing adequately for very high pressure operation.

McCarthy U.S. Pat. No. 1,001,970 discloses a high pressure shut-off valve having an angle body construction with a sleeve type valve plug. The valve sleeve has upper and lower sealing gaskets which are compressed in valve closing movement but which do not seal completely around the valve plug assembly.

Collins U.S. Pat. No. 2,130,614 discloses an in-line valve having a vertically moving valve plug which operates through a horizontally disposed valve port. The valve member is inadequately packed for high pressure operation.

Wilson U.S. Pat. No. 3,013,825 discloses a wire line stripper having a rubber stripping element operated by line pressure to strip the liquid from the line.

Miller U.S. Pat. No. 3,084,898 discloses a valve assembly in which line pressure is used in valve closing operation.

Wing U.S. Pat. No. 3,115,329 shows a pressure operated valve having a piston with a peripheral rubber seal.

Bolling U.S. Pat. No. 3,353,783 discloses an in-line valve having a vertically movable plug valve assembly. The plug valve assembly is inadequately sealed for high pressure operation. This valve does show a movable valve seat which is compressed by line pressure against the valve member.

Gruber U.S. Pat. No. 3,377,048 discloses a tap valve of the type used for controlling water in sinks or tubs. This valve includes an arrangement to apply line pressure against the valve member in the closing position.

SUMMARY OF THE INVENTION

One of the objects of this invention is to provide a new and improved high pressure shut-off valve for use in the oil and gas industry, chemical processing plants and the like.

Another object of this invention is to provide a new and improved high pressure shut-off valve having an in-line construction providing for straight line flow of high pressure fluids or gases through the valve.

Another object of this invention is to provide a new and improved high pressure shut-off valve having a straight line construction with a reciprocal plug valve having a peripheral sealing element preventing pressure loss around the valve plug.

Still another object of this invention is to provide a new and improved in-line type high pressure shut-off valve which utilizes line pressure to compress the valve sealing element.

Still another object of this invention is to provide a new and improved high pressure shut-off valve having an improved compressible sealing element for a reciprocal valve plug which is protected from contamination under conditions of flow and protected against an extrusion of the sealing element.

Still another object of the invention is to provide a high pressure shut-off valve of in-line construction which has a reciprocal plug which is sealed both upstream and downstream when in the open position.

Still another object of the invention is to provide a high pressure shut-off valve of in-line construction which has a reciprocal plug and which is self purging when in the open position.

Still another object the invention is to provide a new and improved high pressure shut-off valve having a construction which is field servicable.

Other objects of the invention will become apparent from time to time throughout the specifications and claims as hereinafter related.

The above noted objects and other objects of the invention are accomplished by a high pressure shut-off valve consists of a hollow valve body having an open end, a closed end and a cylindrical cavity with a cover therefor. Aligned tubular inlet and outlet portions on opposite sides of the valve body form a continuous straight bore intersecting the cavity at a right angle thereto.

A plug valve assembly positioned in the valve body cavity has a supporting mandrel a slidable therein between an extended position abutting the closed end and a retracted position some distance therefrom. The mandrel has an end portion with a laterally extending valve passage and an intermediate portion closing the valve body bore when in the extended position, the valve passage being aligned with the bore when in the retreated position. A sealing sleeve member of elastomeric material surrounds the mandrel intermediate portion and engages the entire circumferential wall of the cavity around the bore to seal against leakage when the valve is closed.

A non-rising threaded stem, operated by a hand wheel, moves the plug valve assembly between the extended and retracted positions and has a lost motion connector engageable with the sleeve member in the extended position to compress the the sleeve member longitudinally along said mandrel. Metal discs are positioned in holes in the sleeve member aligned with the bore when the valve is closed to prevent extrusion of the sleeve into the bore. A pressure release passage in the valve body bleeds line pressure to the cavity above the sleeve member to pressurize the same when in the valve closed position.

DESCRIPTION OF THE PREFERRED EMBODIMENT

Figure 1:
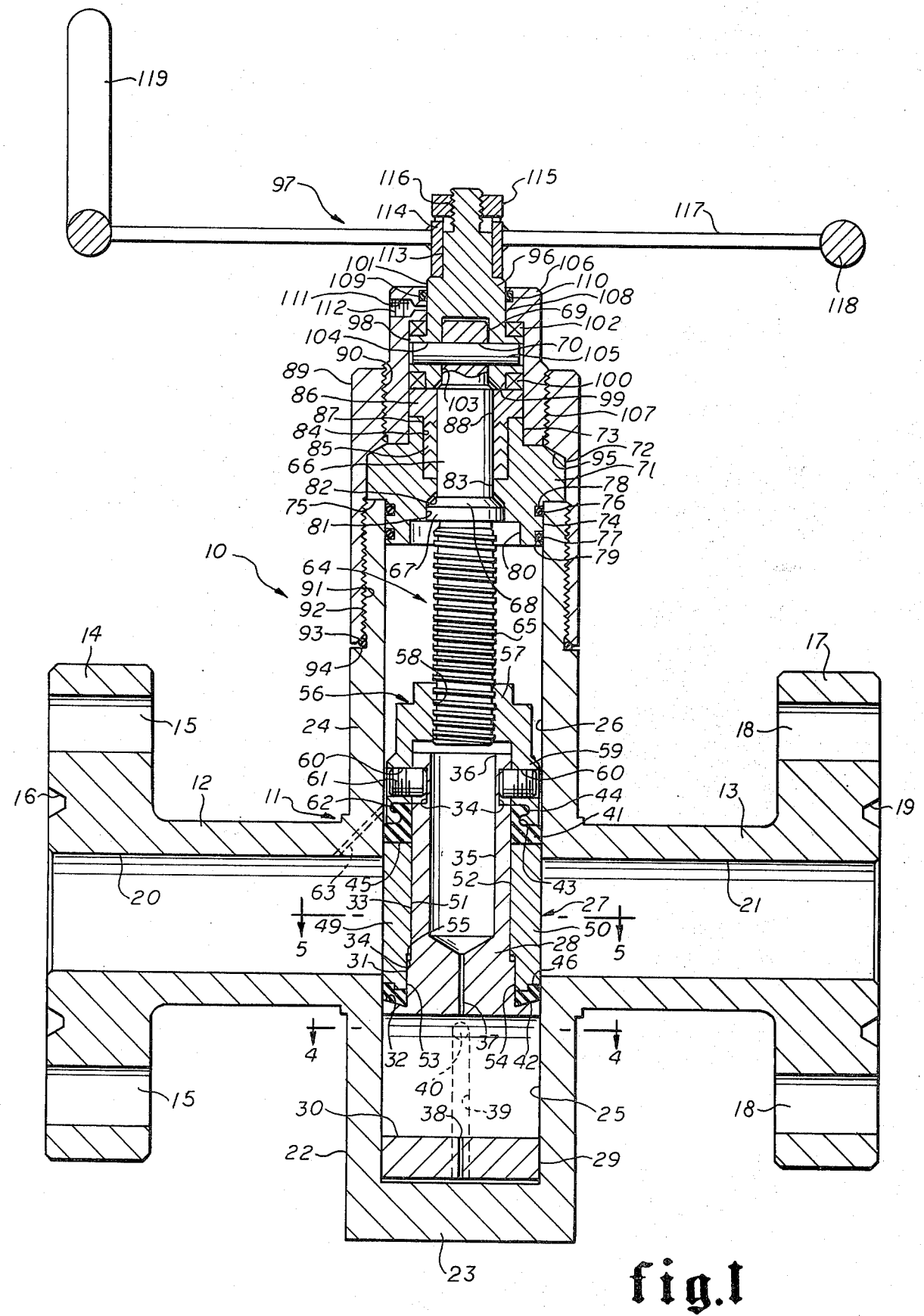
FIG. 1 is a view in longitudinal central section of a preferred embodiment of the high pressure shut-off valve of this invention in a valve closed position.
Figure 2:
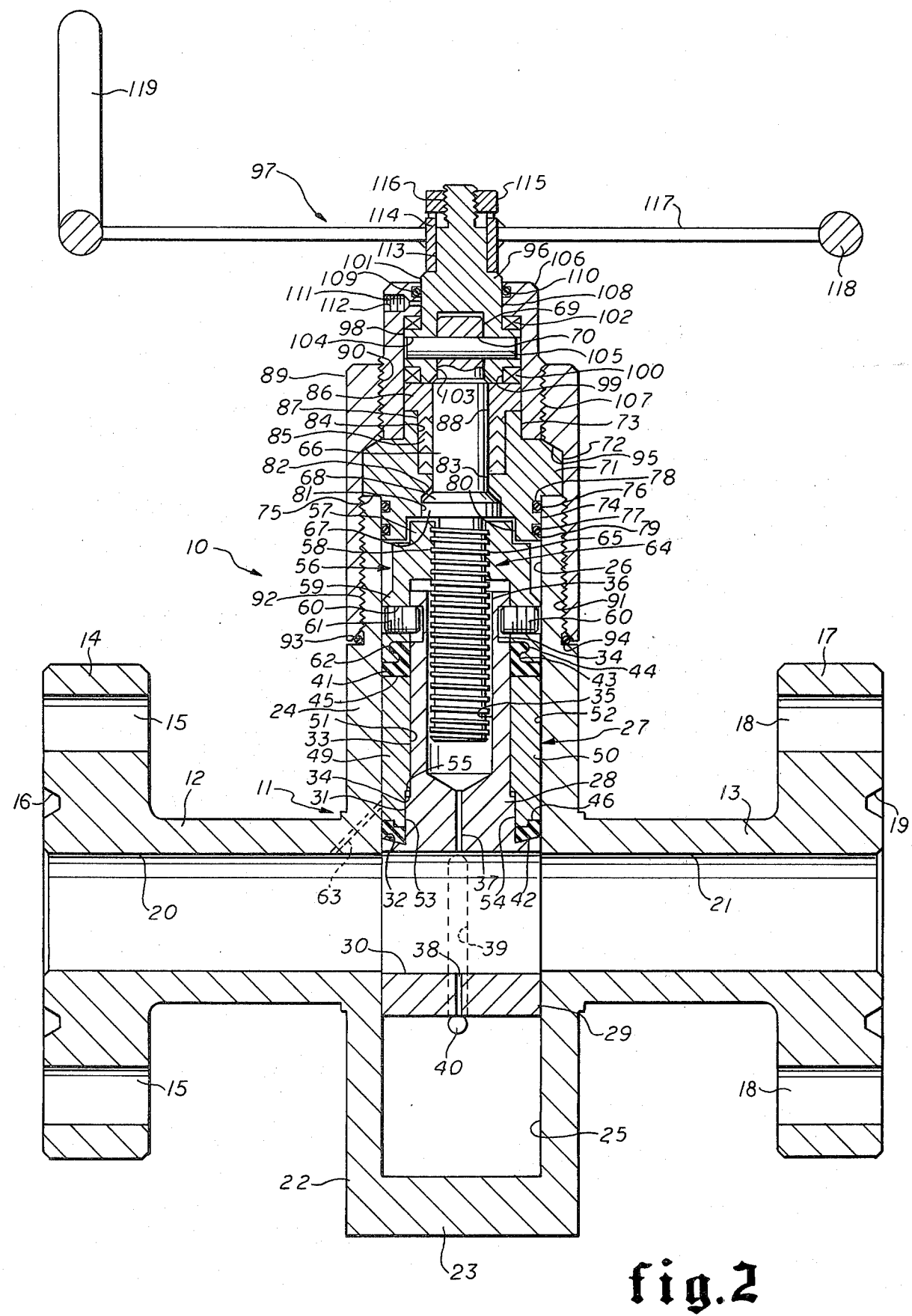
FIG. 2 is a sectional view showing the valve illustrated in FIG. 1 in a valve open position.
Figure 3:
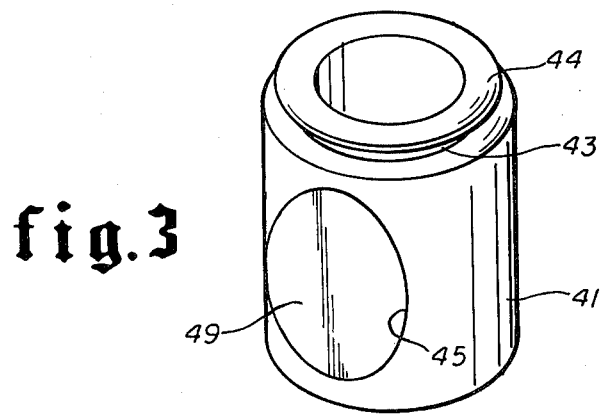
FIG. 3 is an isometric view of the valve sealing element.
Figure 4:
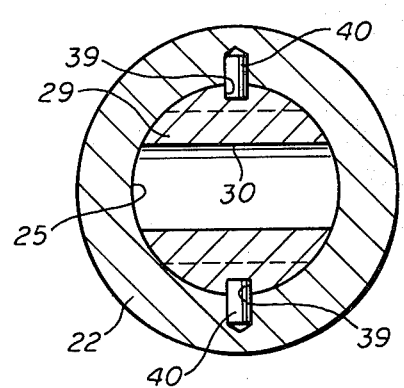
FIG. 4 is a sectional view taken on the line 4—4 of FIG. 1 showing the mandrel slots and guide pins in the valve body.
Figure 5:
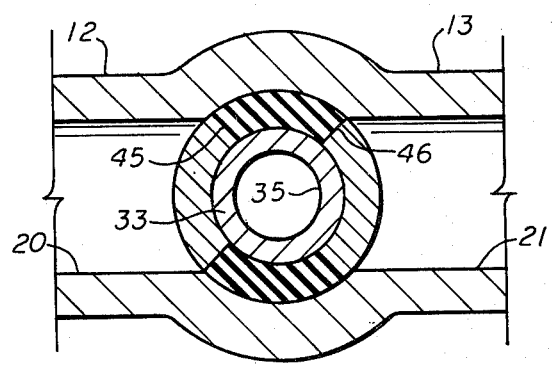
FIG. 5 is a sectional view taken on the line 5—5 of FIG. 1 showing the valve closing portion of the plug valve assembly.

Referring to the drawings by numerals of reference, and more particularly to FIGS. 1 and 2, there is shown a high pressure valve 10 for stopping the flow of high pressure fluids and gases. Valve 10 is designed for very high pressure operation and is preferably made of a forged alloy steel which permits use of the valve to meet the needs and requirements for hostile and corrosive environments.

Valve 10 comprises the valve body 11 which is preferably of a forged alloy steel. Valve body 11 has a tubular inlet portion 12 and tubular outlet portion 13 on opposite sides thereof. Tubular inlet portion 12 is provided with an end flange 14 having holes or apertures 15 for bolting to a flanged conduit or a flanged connection on a container, pressure vessel or the like. An annular groove 16 in the end face of flange 14 is provided to receive a sealing ring or gasket (not shown). Tubular outlet portion 13 has a flange 17 with holes or apertures 18 for bolting to another flange connector on a conduit or pressure vessel or the like. Annular groove 19 is provided to receive a sealing ring or gasket.

Inlet valve portion 12 has a tubular passage 20 therethrough which is aligned with tubular passage 21 in outlet valve portion 13. Passages 20 and 21 are in direct alignment with each other and comprise a continuous bore passing through the valve body in a straight line. Valve body 11 has a tubular body portion 22 extending downward at a right angle to the valve bore and having an end wall 23, and another tubular body portion 24 extending upward at a right angle to the valve bore to provide a support for the operating mechanism of the valve. Tubular valve body portion 22 has a cylindrical inner wall 25 which intersects the valve bore (passages 20 and 21) and opens into a cylindrical inner wall 26 of tubular valve body portion 24. The cylindrical wall portions 25 and 26 of valve body portions 22 and 24 form a smooth continuous cylindrical passage in which the valve assembly is moved.

A cylindrical valve plug assembly 27 is positioned for vertical sliding movement in the vertically extending passage in valve body 11 defined by cylindrical walls 25 and 26. Valve plug assembly 27 consists of a mandrel 28 having an enlarged cylindrical end portion 29 having a horizontally extending valve passage 30 therethrough. Mandrel 28 is supported for movement in the body valve body so that upward movement thereof will cause valve passage 30 to be aligned with the valve bore (passages 20 and 21) to permit flow of fluid through the valve. Mandrel 28 has a first portion 31 of reduced diameter which defines a shoulder 32 extending peripherally of the mandrel. A second portion 33 of reduced diameter extends upward from a second peripherally extending shoulder 34. Mandrel portion 33 is provided with a plurality of slots or grooves 34 which cooperate with retainer pins which will be subsequently described.

Mandrel portion 33 is tubular in shape and has an internal bore 35 extending longitudinally thereof which is open at its top end portion 36 and has a pressure equalizing port 37 opening from its bottom end into the valve passage 30 in the enlarged mandrel portion 29. Mandrel portion 29 also has a pressure equalizing port or passage 38 opening through the wall thereof to permit pressure to exhaust the space below the end of the mandrel adjacent to end wall 23 of valve body portion 22. Mandrel portion 29 has a pair of longitudinally extending grooves 39 on opposite sides thereof into which are fitted pins 40 which guide mandrel 29 for vertical or longitudinal movement while keeping the mandrel positioned so that the valve passage or port 30 will be aligned with the valve bore (passages 20 and 21) when the valve plug assembly is moved to an elevated position as shown in FIG. 2.

A valve sealing assembly is supported on mandrel 27 and consists of a tubular rubber (or synthetic rubber or other suitable elastomeric material) sealing element 41. Sealing element 41 has its lower end portion beveled as at 42 to fit the shoulder 32 of mandrel 27. The upper end portion of sealing element 41 is provided with a peripheral groove 43 defining a flange 44. Sealing element 41 has openings 45 and 46 on opposite sides thereof which are aligned with and slightly larger than the valve opening defined by the intersection of the valve bore (passages 20 and 21) with the vertically extending passage in the valve body defined by cylindrical walls 25 and 26.

Figure 6:
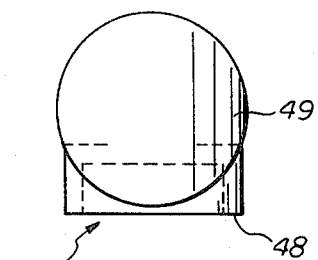
FIG. 6 is a view in side elevation of the metal sleeve and extrusion preventing discs fitting inside the sealing sleeve.
Figure 7:
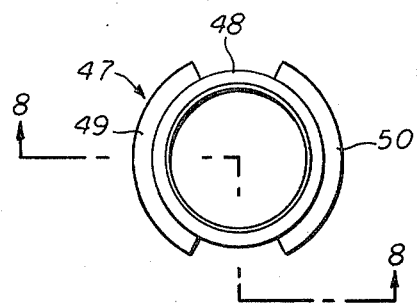
FIG. 7 is a bottom plan view of the disc and sleeve element shown in FIG. 6.
Figure 8:
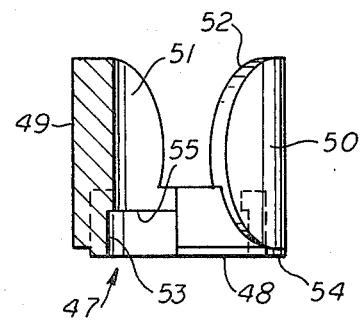
FIG. 8 is a sectional view of the disc and sleeve element taken on the line 8—8 of FIG. 7.

A metal sealing element retaining sleeve member 47 is positioned within rubber sealing element 41 and surrounds the upper portion 33 of mandrel 28. Sleeve member 47 has a tubular sleeve portion 48 (see FIGS. 6–8) with cylindrically curved discs 49 and 50 formed integrally therewith on opposite sides thereof. The outer surface of discs 49 and 50 lie on a single cylindrical surface fitting in the vertical passage in the valve body 11 defined by cylindrical walls 25 and 26 for smooth vertical movement therein. This cylindrical surface is continuous with the outer surface of cylindrical rubber sealing element 41. Discs 49 and 50 fit within passages or openings 45 and 46 in rubber sealing element 41 and are larger than the opening from passage 20 and 21 into the vertically extending passage or opening in which the valve plug assembly 27 is moved.

Thus, when the valve is in a closed position, as seen in FIG. 1, the valve discs 49 and 50 prevent extrusion of the rubber sealing element into the valve bore under pressure. The inner surfaces 51 and 52 of discs 49 and 50 lie on a single cylindrical surface and fit closely around the reduced tubular portion 33 of mandrel 28 for sliding movement thereon. Cylindrical surfaces 51 and 52 open into lower enlarged cylindrical surfaces 53 and 54 which fit on surface 31 of mandrel 28 for sliding movement thereon. Shoulder 55 between surfaces 51 and 53 (and 52 and 54) is spaced from and engageable with shoulder 34 on mandrel 28.

At the upper end of valve plug assembly 27, there is provided a seal compression nut 56 which is cup shaped and fits over the upper end of mandrel 28 and rubber sealing element 41. Seal compression nut 56 has a thick end wall portion 57 which is internally threaded as at 58 to receive a valve stem. Seal compression nut 56 has tubular side wall 59 with a plurality of apertures or openings 60 which are threaded and have pins 61 secured therein which fit into grooves or slots 34 in mandrel 28. Pins 61 are smaller in diameter than the width of slots 34 and engage the upper edge thereof on vertical movement and permit relative movement in a downward direction permitting the application of compressive force to the upper end of rubber sealing element 41.

The lower end of tubular wall portion 59 of seal compression nut 56 is provided with internal groove 62 which fits the upper flange portion 44 of rubber sealing element 41. The outer surface of the tubular portion 59 of seal compression nut 56 is slightly smaller than the passage defined by the cylindrical wall 26 of the upper tubular valve body portion 24. This provides a clearance which permits fluid pressure from passage or opening 20 (high pressure side of the valve) to enter the chamber above the valve plug assembly 27 through a pressure release passage 63 in the valve body 11. The upper portion of rubber sealing element 41 has a larger annular surface area than the lower portion as a result of the reduced diameter of the upper portion 33 of mandrel 28.

Valve stem 64 has a threaded portion 65 which extends into threaded opening 58 in seal compression nut 57. Rotation of valve stem 64 causes seal compression nut to move upwardly or downwardly along the valve stem to raise or lower plug valve assembly 27. Valve stem 64 has a smooth cylindrical portion 66 at its upper end with a flange 67 having a tapered edge portion 68 adjacent the upper end of the threaded portion 65. The extreme upper end 69 of valve stem 64 is reduced in diameter and has an opening 70 for receiving a connector pin.

A valve stem bonnet gland or adapter 71 is provided at the upper end of valve body portion 24 to support the valve stem 64 for rotary movement. Valve stem bonnet gland 71 has a central portion 72 with a hollow extension 73 extending from one end and another hollow extension 74 extending from the opposite end. Shoulder 75 between the enlarged central portion 72 and tubular portion 74 abuts the upper end of valve body portion 24. Tubular extension 74 fits tightly in the upper end of valve body portion 24 and is sealed against pressure leakage by O-rings 76 and 77 positioned in peripheral grooves 78 and 79. Valve stem bonnet gland 71 has a counterbore 80 which opens into a further counterbore 81 having a tapered portion 82 providing a valve stem back seat engageable by the tapered surface 68 on valve stem flange 67. Tapered portion 82 of counterbore 81 opens into a smaller bore 83 which provides a bearing surface in which the upper cylindrical portion 66 of valve stem 64 is supported.

The upper portion of valve stem bonnet gland 71 has a counterbore 84 which provides an annular cavity surrounding the upper valve stem portion 66. This cavity is provided with valve stem packing 85 which is preferably a chevron type packing. A packing adapter 86 fits over the end of extension 83 on valve stem bonnet gland 71 and has a tubular extension 87 which extends into engagement with the upper portion of valve stem packing 85 to hold the same under compression. Packing adapter 86 has a bore 88 of the same size as the cylindrical portion 66 of valve stem 64 to support the same as a journal bearing therefor.

A cap or valve bonnet adapter nut 89 is supported on the upper end of valve body portion 24. Cap 89 is tubular in shape and is internally threaded as indicated at 90. Cap 89 has an enlarged bore which is internally threaded as indicated at 91 and is supported in threaded relation with the threaded end portion 92 of the upper valve body portion 24. An O-ring or gasket 93 is provided as a pressure seal between the lowermost end of cap 89 and shoulder 94 on valve body portion 24. Cap 89 has an internally beveled portion 95 which fits against the upper end of valve bonnet adapter 71 to secure the same in tight engagement with the end of valve body portion 24.

A valve stem adapter 96 is positioned at the end of valve stem 64 to provide for connection to a hand wheel 97 for rotation of the valve stem for moving the valve plug assembly 27 upwardly and downwardly in the valve body. Valve stem adapter 96 has a central cylindrical body portion 98 with a lower cylindrical portion 99 of reduced diameter providing a shoulder on which there is positioned bearing assembly 100. Valve stem adapter 96 has an upper cylindrical portion 101 of reduced diameter providing a shoulder on which there is supported another bearing assembly 102. Adapter 96 has an internal bore or cavity 103 into which the upper extension 69 of valve stem 64 extends. The main portion 98 of valve stem adapter 96 has a laterally extending opening 104 which is aligned with opening 70 and in which there is positioned a valve stem retaining pin 105.

Valve stem adapter 96 and bearing assemblies 100 and 102 are secured by bearing retainer 106. The bearing retainer 106 is cup shaped and externally threaded as at 107 for threaded connection in the internally threaded opening 90 of cap 89. Bearing retainer 106 has an internal bore 108 which functions as a journal bearing supporting the upper portion 96 of the valve stem adapter. Bore 108 is provided with an annular groove 109 and O-ring to seal the valve stem adapter against pressure leakage. Bearing retainer 106 has a threaded grease fitting 111 with a plug 112 therein to permit application of grease to the bearings during operation.

The upper end of valve stem adapter 96 has a portion 113 of reduced diameter which receives a cylindrical hub 114 of hand wheel 97. Hub 114 is secured in place by a retaining nut 115 on the threaded extension 116 of valve stem adapter 96. Hand wheel 97 has a plurality of spokes 117 leading to the annular wheel portion 118 from which there extends an operating handle 119.

OPERATION

The valve described above is a forged steel valve of straight through flow design that can be used for stopping the flow of high pressure fluids and gases. Forged alloy steel is preferred in the construction to permit the application of the valve in hostile and corrosive environments.

The valve 10 is shown in FIG. 1 in a closed position. The plug valve assembly 27 is completely lowered until the bottom end portion 29 of mandrel 28 engages the end wall 23 of valve body portion 22.

The valve is normally connected with inlet portion 12 connected to high pressure and outlet portion 13 connected to an outlet line or connection. The valve body is provided with seals against leakage of high pressure fluid at a number of points. O-ring or packing 93, O-rings 76, 77 and 110, and valve stem packing 85 provide for a complete seal against pressure loss through any of the points of assembly of the valve.

In the position shown in FIG. 1, the bottom end portion 29 of mandrel 28 has just contacted the end wall 23 of valve body portion 22. The valve plug assembly 27, including mandrel 28, sealing element 41 and retaining sleeve member 47 are moved reciprocally by means of seal compression nut 56 which rides up and down along valve stem 64 on rotation thereof by hand wheel 97. In the position shown, hand wheel 97 has been moving compression nut 56 downward.

In this position, further rotation of hand wheel 97 is possible which will move seal compression nut 56 downward relative to the upper tubular portion 33 of mandrel 28. This relative movement will cause rubber sealing element 41 to be compressed around the entire peripheral surface of mandrel 28 to provide a very tight seal against the cylindrical walls 25 and 26 of the valve body 11. This continued downward movement of seal compression nut 56 can be continued until pins 61 engage the bottom edge of the respective grooves or slots 34 in the tubular portion 33 of mandrel 28.

In the position shown, high pressure fluid from the inlet bore 20 is passed through pressure release passage 63 into the cavity of valve body portion 24 above the mandrel 28 and rubber selaing element 41. As noted in the description of parts and mode of assembly of the valve, rubber sealing element 41 has a larger annular area on the upper side than on the lower side thereof. As a result of this differential in area, the pressure from the inlet bore 20 will maintain rubber sealing element 41 under compression.

Thus, the hand wheel 97 can be tightened to compress the rubber sealing element 41 and the fluid pressure from inlet bore 20 will maintain sealing element 41 under compression when the hand wheel is backed off to the point where pins 61 just engage the upper edge of slots 34, as shown in FIG. 1. In this position, the valve is being held in a tightly sealed position by application of the inlet pressure to the cavity above the rubber sealing element 41, even though hand wheel 97 has been backed off to the point where further movement will cause seal compression nut 56 to rise along the threaded portion 65 of valve stem 64 to start to move the valve plug assembly toward open position.

In the position shown in FIG. 1, with rubber sealing element 41 held in tight compression, first by downward movement of seal compression nut 56 and subsequently by application of fluid inlet pressure above the sealing element, the discs 49 and 50 are sealing the valve bore to prevent flow of fluid or gas therethrough and also function to prevent extrusion of rubber sealing element 41 into the valve bore. It should be noted that the valve plug assembly 27 is constructed with the rubber sealing element 41 extending completely around the mandrel 28 so that a seal is provided against the bore of the valve body 11 around the entire contacting surface except for the portion occupied the anit-extrusion discs 49 and 50. The amount of downward movement of discs 49 and 50 and the sleeve portion 48 is limited by the engagement of shoulder 55 with shoulder 34 on mandrel 28. The rubber sealing element 41 therefore provides a positive seal around the entire perimeter of the reciprocal plug assembly and seals in both the upstream and downstream directions.

Rotation of the valve wheel 97 by handle 119 or rim 118 will rotate the valve stem 64 for moving the plug valve assembly 27. Rotation in a clockwise direction moves the plug valve assembly downward toward the closed position shown in FIG. 1 while rotation in a counterclockwise direction moves the plug valve assembly 27 toward the open position shown in FIG. 2. The valve stem 64, and particularly the threaded portion 65 thereof, is a non-rising stem. It is rotated in a fixed position longitudinally as confined by the stem bonnet gland 71, stem adaptor 96, bearings 100 and 102, etc.

As hand wheel 97 is rotated in a counterclockwise direction, the threaded portion 65 of valve stem 64 causes seal compression nut 56 to move upward. The bore 35 of mandrel 28 provides for movement of the plug valve assembly 27 to a fully opened position, as shown in FIG. 2. As plug valve assembly 27 is moved upward by rotation of valve stem 64, the rubber sealing element 41 is first decompressed ang then the engagement of pins 61 with the upper edge slots 34 causes the entire assembly to move together toward an open position. Guide pins 40 in slots 39 keep the mandrel 28 (and plug valve assembly 27) from turning during movement and thus assure alignment of valve mandrel bore 30 with the valve body bore when moved to a valve open position.

As plug valve assembly 27 is moved upward, pressure from above the valve assembly can vent through pressure release passage 37, first into the valve mandrel bore 30 and then into the main valve bore when the valve begins to align with said bore. Continued movement of plug valve assembly 27, by counterclockwise rotation by hand wheel 97, brings it to the position shown in FIG. 2 with mandrel bore 30 in alignment with inlet passage 20 and outlet passage 21 which form the continuous straight, in line bore fo the valve body. When the plug valve assembly is moved to a fully opened position, the entire sealing element 41 is positioned above the main flow of fluid or gases through the bore of the valve body. The valve assembly is self purging in the open position as a result of the aspirating effect produced by flow of fluids or gases through valve opening 30 along the aperture or opening 38 extending into the bottom of cavity 26.

This valve does not require any lubrication in normal operation. The bearing assemblies 100 and 102 are prepacked at the plant and are sealed to the bearing elements. However, grease fitting 111 is provided in the bearing retainer nut 106 if greasing should ever be required. The entire valve is field repairable. The plug valve assembly 27 may be removed for repair or replacement by removing bonnet adaptor nut or cap 89 after first releasing or stopping the application of line pressure.

The stem packing 85 and bearing assemblies 100 and 102 may be changed even while the valve is under pressure. Such a change is accomplished by means of the back seat 82. To change the packing and bearings, the valve is moved first to a closed position as shown in FIG. 1. Next, the bearing retainer 106 is backed off slowly in a clockwise direction and the hand wheel 97 is turned slowly in the clockwise direction. This allows the value stem 64 to move up and back seat shoulder 68 against the back seat 82 in the bonnet adaptor 71. If the valve back seats and seals and pressure releases from the stem packing 84, the bearing retainer 106 may then be completely removed. Next, the stem adaptor 96 is removed and the stem adaptor pin 105 and the bearing assemblies 100 and 102 are removed. The stem packing 84 is then removed. To install new packing and bearings, the procedure just described is carried out in reverse order.

While this invention has been described fully and completely with special emphasis upon a single preferred embodiment of the invention, it should be understood that within the scope of the appended claims, this invention may be practiced otherwise than as specifically described herein.

We claim:

1. A high pressure shut-off valve comprising
a hollow valve body having an open end, a closed end and a cylindrical cavity therein,
cover means for said open end,
aligned tubular inlet and outlet portions on opposite sides of said valve body defining a continuous straight bore intersecting said cavity at a right angle thereto, a plug valve assembly positioned in said cavity and comprising a supporting mandrel having a sliding fit in said cavity between and extended position abutting said closed end and a retracted position a predetermined distance therefrom, said mandrel having an end portion with a laterally extending valve passage therethrough and an intermediate portion closing said valve body bore when in said extended position and said valve passage being aligned with said valve body bore when in said retracted position, said intermediate portion being of one-piece construction with a fixed radius and providing fixed surfaces of cylindrical configuration having a sliding fit in said cavity, a sealing sleeve member of elastomeric material surrounding said mandrel intermediate portion and movable relative thereto and engaging the entire circumferential wall of said cavity around said bore to seal the same against leakage when closed, and operating means for moving said plug valve assembly between said extended and retracted positions and including means engageable with said sleeve member in said extended position to compress the same longitudinally along said mandrel to against leakage of pressure around said intermediate mandrel portion.

2. A high pressure shut-off valve according to claim 1 which said valve assembly operating means comprises a rotatable non-rising threaded operating stem supported in said cover means, rotary operating means for said stem positioned outside said cover means, and lost motion connection means interconnecting said stem and said plug valve assembly and movable relative thereto to engage and compress said sleeve member on movement thereof to said extended position.

3. A high pressure shut-off valve according to claim 2 in which said rotary operating means comprises a manually operated wheel operatively secured on an end of said operating stem.

4. A high pressure shut-off valve according to claim 2 in which said mandrel intermediate portion includes a supporting sleeve member, a pair of radially fixed cylindrically curved discs, integral with said supporting sleeve member, slidably fitting said valve body cavity and a size slightly larger than said valve body bore, said first named sleeve member being supported on said supporting sleeve member, having openings on opposite sides thereof aligned with said bore when in said extended position and having said discs rigidly positioned therein to prevent said sleeve from extruding into said bore when compressed by said lost motion connection means.

5. A high pressure shut-off valve according to claim 4 in which said mandrel, discs and supporting sleeve are of metal.

6. A high pressure shut-off valve according to claim 1 in which said valve body has a bleed passage from said bore on the valve body inlet side to a point in said cavity communicating with the space above said sleeve member in said extended position to apply valve fluid pressure thereto to maintain said sleeve member under pressure.

7. A high pressure shut-off valve according to claim 1 in which said valve body has a bleed passage from said bore on the valve body inlet side to a point in said cavity communicating with the space above said sleeve member in said extended position to apply valve fluid pressure thereto to maintain said sleeve member under pressure, and said mandrel has an enlarged end portion with said valve passage therein of a size fitting said cavity for sliding movement therein, and two portions of lesser diameter on which said sleeve member is positioned, whereby the upper end of said sleeve member has a larger annular end surface area than the lower end thereof.

8. A high pressure shut-off valve according to claim 4 said valve body has a bleed passage from said bore on the valve body inlet side to a point in said cavity communicating with the space above said sleeve member in said extended position to apply valve fluid pressure thereto to maintain said sleeve member under pressure, said valve assembly operating means comprises a rotatable non-rising threaded operating stem, rotary operating means for said stem, lost motion connection means interconnecting said stem and said plug valve assembly and movable relative thereto to engage and compress said sleeve member on movement thereof to said extended position a pair of cylindrically curved discs fitting said valve body cavity and of a size slightly larger than said valve body bore, said sleeve member having openings on opposite sides thereof aligned with said bore when in said extended position and having said discs positioned therein to prevent said sleeve from extruding into said bore when compressed by said lost motion connection means, and said mandrel having an enlarged end portion with said valve passage therein of a size fitting said cavity for sliding movement therein, and two portions of lesser diameter on which said sleeve member is positioned, whereby the upper end of said sleeve member has a larger annular end surface area than the lower end thereof.

9. A high pressure shut-off valve according to claim 8 in which said mandrel has a longitudinally extending bore, of a size sufficient to receive said operating stem, extending to a wall portion separating the same from said valve passage, and a bleed passage from said mandrel bore into said valve passage.

10. A high pressure shut-off valve according to claim 9 in which said lost motion connection means comprises a cup shaped member fitting over the open end of said mandrel and having a threaded opening in the base wall thereof receiving said operating stem to raise and lower said plug vavle assembly on rotation thereof, said mandrel having slots in the wall thereof, and pins secured in said cup shaped member fitting said mandrel slots to permit lost motion therebetween, excessive movement of said cup shaped member toward said extended position causing the same to move relative to said mandrel to engage and compress the end of said sleeve member.

11. A high pressure shut-off valve according to claim 10 in which said valve body cover means includes bearing means for said operating stem, and pressure sealing and packing means sealing said operating stem and said said cover means against pressure leakage.

12. A high pressure shut-off valve according to claim 11 in which said operating stem includes a back sealing flange thereon engagable with part of said cover means upon predetermined movement in said retracted position, and said cover means including a removable portion permitting access to said bearing and packing means for service and replacement while said valve is connected under pressure.

13. A high pressure shut-off valve according to claim 9 in which said mandrel had longitudinally extending guide slots along opposite sides of the portion in which said valve passage is positioned, and pins positioned in the wall of said valve body extending into said last named slots to guide the upward and downward movement of said mandrel to assure alignment of said valve passage with said valve body bore when in said retracted position.

14. A high pressure shut-off valve according to claim 1 in which said mandrel intermediate portion includes a supporting sleeve member, a pair of radially fixed cylindrically curved discs, integral with said supporting sleeve member, slidably fitting said valve body cavity and of a size slightly larger than said valve body bore, said first named sleeve member being supported on said supporting sleeve member, having openings on opposite sides thereof aligned with said bore when in said extended position and having said discs rigidly positioned therein to prevent said sleeve from extruding into said bore when compressed by said lost motion connection means, said valve assembly operating means comprises a rotatable non-rising threaded operating stem supported in said cover means, rotary operating means comprising a manually operated wheel operatively secured on an end of said operating stem positioned outside said cover means for turning said stem, lost motion connection means interconnecting said stem and said plug valve assembly and movable relative thereto to engage and compress said sleeve member on movement thereof to said extended position, and said mandrel, discs and supporting sleeve being of metal.

15. A high pressure shut-off valve according to claim 14 in which said valve body has a bleed passage from said bore on the valve body inlet side to a point in said cavity communicating with the space above said sleeve member in said extended position to apply valve fluid pressure thereto to maintain said sleeve member under pressure.

16. A high pressure shut-off valve according to claim 15 in which said mandrel has an enlarged end portion with said valve passage therein of a size fitting said cavity for sliding movement therein, and two portions of lesser diameter on which said sleeve member is positioned, whereby the upper end of said sleeve member has a larger annular end surface area than the lower end thereof.

17. A high pressure shut-off valve according to claim 15 including said valve assembly operating means comprises a rotatable non-rising threaded operating stem, rotary operating means for said stem, lost motion connection means interconnecting said stem and said plug valve assembly and movable relative thereto to engage and compress said sleeve member on movement thereof to said extended position and said mandrel having an enlarged end portion with said valve passage therein of a size fitting said cavity for sliding movement therein, and two portions of lesser diameter on which said sleeve member is positioned, whereby the upper end of said sleeve member has a larger annular end surface area than the lower end thereof.

18. A high pressure shut-off valve according to claim 17 in which said mandrel has a longitudinally extending bore, of a size sufficient to receive said operating stem, extending to a wall portion separating the same from said valve passage, and a bleed passage from said mandrel bore into said valve passage.

19. A high pressure shut-off valve according to claim 18 in which said lost motion connection means comprises a cup shaped member fitting over the open end of said mandrel and having a threaded opening in the base wall thereof receiving said operating stem to raise and lower said plug vavle assembly on rotation thereof, said mandrel having slots in the wall thereof, and pins secured in said cup shaped member fitting said mandrel slots to permit lost motion therebetween, excessive movement of said cup shaped member toward said extended position causing the same to move relative to said mandrel to engage and compress the end of said sleeve member.

20. A high pressure shut-off valve according to claim 19 in which said valve body cover means includes bearing means for said operating stem, and pressure sealing and packing means sealing said operating stem and said said cover means against pressure leakage.

21. A high pressure shut-off valve according to claim 20 in which said operating stem includes a back sealing flange thereon engagable with part of said cover means upon predetermined movement in said retracted position, and said cover means including a removable portion permitting access to said bearing and packing means for service and replacement while said valve is connected under pressure.

22. A high pressure shut-off valve according to claim 21 in which said mandrel had longitudinally extending guide slots along opposite sides of the portion in which said valve passage is positioned, and pins positioned in the wall of said valve body extending into said last named slots to guide the upward and downward movement of said mandrel to assure alignment of said valve passage with said valve body bore when in said retracted position.

* * * * *